S. H. GAGE & G. W. BENEDICT.
Vehicle Side-Spring.
No. 215,515.          Patented May 20, 1879.
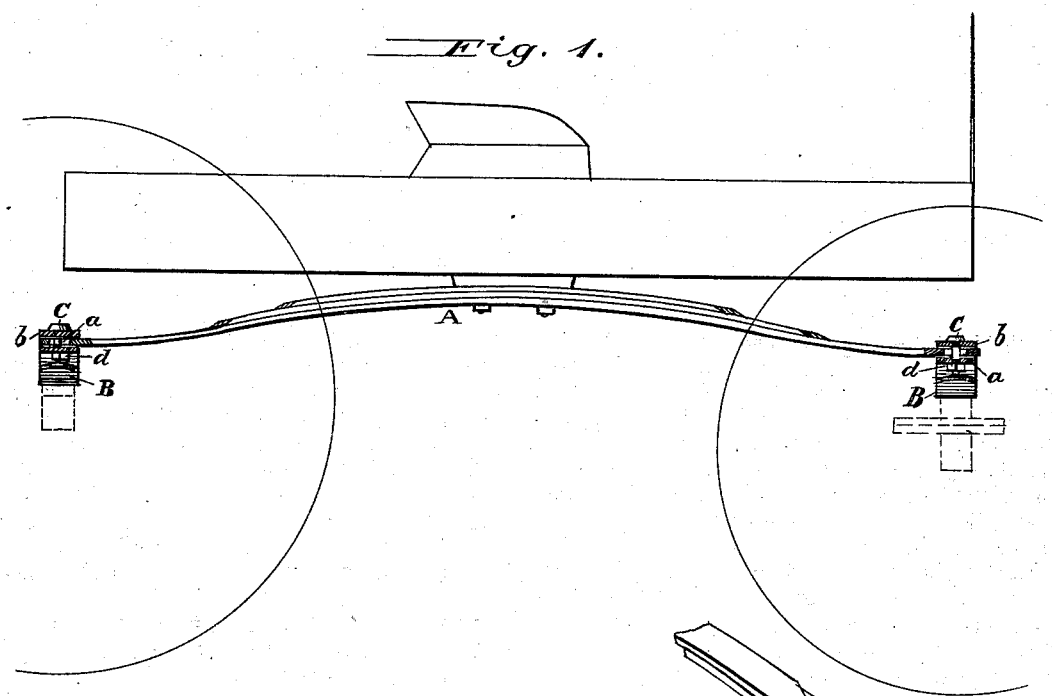
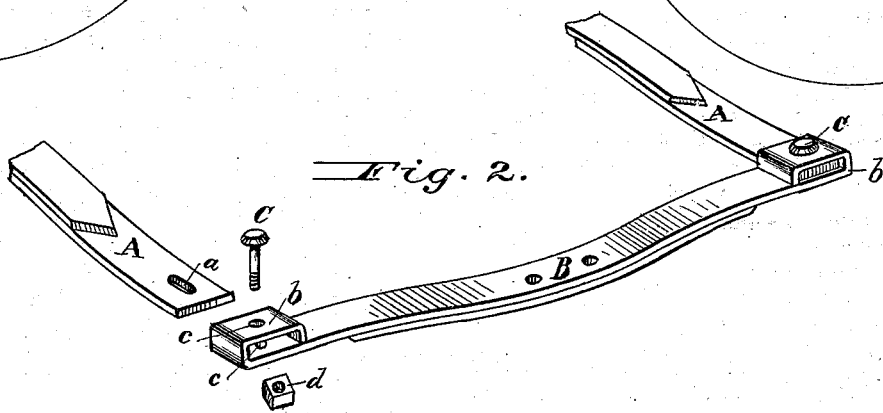
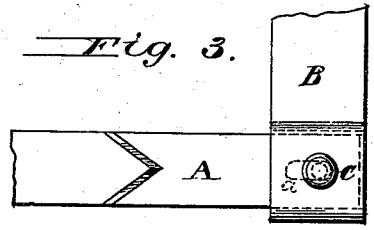

UNITED STATES PATENT OFFICE.

SNYDER H. GAGE AND GEORGE W. BENEDICT, OF FORT PLAIN, NEW YORK.

IMPROVEMENT IN VEHICLE SIDE SPRINGS.

Specification forming part of Letters Patent No. 215,515, dated May 20, 1879; application filed October 29, 1878.

*To all whom it may concern:*

Be it known that we, SNYDER HOAG GAGE and GEORGE WASHINGTON BENEDICT, of Fort Plain, in the county of Montgomery, in the State of New York, have invented a new and useful Improved Side Spring for Vehicles, of which the following is a full, clear, and exact description, reference being had to the accompanying drawings, wherein—

Figure 1 is a side elevation of a vehicle with the ends of the springs in section; Fig. 2, a perspective view, and Fig. 3 a top-plan view, of the ends of the springs.

Our invention relates to the mode of uniting the ends of the longitudinal and cross springs of a side-spring vehicle. This has heretofore been accomplished in a variety of ways—as by bolts passed through slots or holes in the ends of the overlapped springs, by jointed shackles, by slip-joints formed of the ends of the springs, and otherwise.

Our invention consists in forming the joints between the springs by making a longitudinal slot in each end of the side springs, and forming a socket upon each end of the cross-springs by bending over the ends of the said cross-springs upon themselves in such manner as to admit of the insertion in said bent portions of the slotted ends of the side springs, and then securing the two sets of springs together by bolts passed through holes in the socketed ends, and through the slots in the side springs, the said slots admitting of the necessary play of the springs incident to the pressure brought upon them.

In the drawings referred to, A A are the side springs, in the ends of which are made the longitudinal slots *a a*. B B are the cross-springs. The ends of these springs B B are bent upward at about a right angle, then horizontally, and then downwardly at a right angle to the horizontal bend, so as to form rectangular sockets *b b* upon each end of these springs, of a width to receive the ends of the side springs. Holes *c c* are made through the upper and lower plates of these sockets.

The springs are united by inserting the slotted ends of the side springs into the sockets of the cross-springs, and passing bolts *c c* through the socket-holes and the slots in the side springs, and securing said bolts by nuts *d d* beneath the cross-springs.

The slots in the ends of the side springs admit of the necessary play of such springs, and the bolts, which are removable, admit of the ready renewal of worn-out or damaged springs.

The sockets serve to confine the side springs without interfering with their play, and protect the joint from the injurious action of gritty dust, &c.

It will be understood that the sockets need not be exact rectangles; but any shape approaching that will answer—as, for instance, the corners of such sockets may be curves instead of angles, and still a rectangular outline will be predominant in them.

What we claim is—

The slotted side springs, in combination with the cross-springs, having their ends formed into sockets to receive said side springs, and with bolts passed through the socketed ends of the cross-springs and the slotted ends of the inclosed side springs, substantially as described.

Witness our hands this 26th day of October, A. D. 1878.

S. H. GAGE.
     G. W. BENEDICT.

Witnesses:
 RUFUS FALING,
 ARCHIBALD WIETING.